United States Patent
Kumar

(10) Patent No.: US 11,157,907 B1
(45) Date of Patent: Oct. 26, 2021

(54) TRANSACTION VALIDATION AND FRAUD MITIGATION

(71) Applicant: Wells Fargo Bank, N.A., San Francisco, CA (US)

(72) Inventor: Pradeep R. Kumar, Bangalore (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 746 days.

(21) Appl. No.: 15/497,707

(22) Filed: Apr. 26, 2017

(51) Int. Cl.
| | |
|---|---|
| G06Q 20/20 | (2012.01) |
| G06Q 20/40 | (2012.01) |
| B64C 39/02 | (2006.01) |
| G01S 19/13 | (2010.01) |

(52) U.S. Cl.
CPC ..... G06Q 20/40145 (2013.01); B64C 39/024 (2013.01); G01S 19/13 (2013.01); G06Q 20/206 (2013.01); B64C 2201/127 (2013.01)

(58) Field of Classification Search
CPC .. G06Q 10/083; G06Q 20/20; G06Q 20/3224; G06Q 20/34; G06Q 20/382; G06Q 20/206; G06Q 20/40145; G05D 1/02; G05D 1/0022; B64C 39/024; B64C 2201/127; G01S 19/13
USPC ......... 235/379–383; 705/18, 28, 30
See application file for complete search history.

(56) References Cited

U.S. PATENT DOCUMENTS

| | | | | |
|---|---|---|---|---|
| 7,421,399 B2 * | 9/2008 | Kimmel | ................. | G06Q 10/10 705/3 |
| 7,610,040 B2 * | 10/2009 | Cantini | ................. | G06Q 20/04 340/5.9 |
| 7,707,089 B1 * | 4/2010 | Barton | ................. | G06Q 20/105 705/35 |
| 7,715,542 B2 * | 5/2010 | Anson | ................... | H04W 4/029 379/207.12 |
| 8,150,772 B2 * | 4/2012 | Mardikar | ........... | G06Q 20/1085 705/64 |
| 8,166,068 B2 * | 4/2012 | Stevens | ................. | G06Q 20/32 705/64 |
| 8,195,576 B1 * | 6/2012 | Grigg | .................... | G06Q 20/20 380/229 |
| 8,577,803 B2 * | 11/2013 | Chatterjee | ............ | G06Q 20/386 705/41 |
| 8,612,340 B1 * | 12/2013 | Yan | .................... | G06Q 20/4016 705/38 |
| 8,635,117 B1 * | 1/2014 | Acuna-Rohter | ... | G06Q 20/4016 705/26.35 |
| 8,646,060 B1 * | 2/2014 | Ben Ayed | ........... | H04L 63/0853 726/9 |
| 8,725,597 B2 * | 5/2014 | Mauseth | ............ | G06Q 30/0201 705/28 |

(Continued)

*Primary Examiner* — Andrew Joseph Rudy
(74) *Attorney, Agent, or Firm* — Womble Bond Dickinson (US) LLP

(57) ABSTRACT

Systems and methods that can verify transactions based upon location disparity between an account holder and POS (point of sale) as well as identity of a customer are provided. The system can employ camera-equipped drones or other image capture mechanisms to perform identity verification on behalf of a financial entity, cardholder or merchant. Further, the innovation provides systems and methodologies by which allegedly fraudulent or suspect transactions can be blocked or further investigated in real- or near real-time so as to assist in loss mitigation and potentially identification of fraudsters.

20 Claims, 8 Drawing Sheets

(56) References Cited

U.S. PATENT DOCUMENTS

| | | | |
|---|---|---|---|
| 8,793,776 B1* | 7/2014 | Jackson | H04W 4/023 |
| | | | 726/7 |
| 8,838,481 B2* | 9/2014 | Moshfeghi | G01S 19/48 |
| | | | 705/16 |
| 8,929,920 B2* | 1/2015 | Khorashadi | H04W 4/029 |
| | | | 455/456.3 |
| 9,002,814 B2* | 4/2015 | Stevens | G06Q 20/32 |
| | | | 707/705 |
| 9,032,498 B1* | 5/2015 | Ben Ayed | H04W 12/0608 |
| | | | 726/9 |
| 9,038,894 B2* | 5/2015 | Khalid | G06Q 20/227 |
| | | | 235/380 |
| 9,047,640 B2* | 6/2015 | Kingston | G06Q 40/02 |
| 9,111,278 B1* | 8/2015 | Barton | G06Q 20/405 |
| 9,117,242 B1* | 8/2015 | Ellis | G06Q 40/00 |
| 9,359,074 B2* | 6/2016 | Ganesh | G08G 5/0069 |
| 9,519,901 B1* | 12/2016 | Dorogusker | G06Q 20/401 |
| 9,552,578 B2* | 1/2017 | Ghosh | G06Q 20/3278 |
| 9,569,767 B1* | 2/2017 | Lewis | G06Q 20/4016 |
| 9,672,509 B2* | 6/2017 | Klingen | G06Q 20/322 |
| 9,697,508 B1* | 7/2017 | Ramalingam | H04W 4/029 |
| 9,721,275 B1* | 8/2017 | Grier | G06Q 30/0269 |
| 9,785,942 B2* | 10/2017 | Sines | G06Q 20/40 |
| 9,799,020 B2* | 10/2017 | Howe | G06Q 20/20 |
| 9,852,416 B2* | 12/2017 | Mahaffey | G06Q 20/3224 |
| 9,858,565 B1* | 1/2018 | Zettner | H04W 4/02 |
| 9,875,592 B1* | 1/2018 | Erickson | G07C 9/00309 |
| 9,967,750 B1* | 5/2018 | Fernandez | H04W 12/12 |
| 9,998,918 B2* | 6/2018 | Gustafson | H04W 12/04 |
| 10,032,151 B2* | 7/2018 | Lau | G06Q 20/20 |
| 10,037,516 B2* | 7/2018 | Mardikar | G06Q 20/20 |
| 10,040,551 B2* | 8/2018 | Erickson | G16H 50/20 |
| 10,055,733 B2* | 8/2018 | Hanna | H04W 12/06 |
| 10,062,071 B2* | 8/2018 | Sanchez | G06Q 20/40 |
| 10,062,887 B2* | 8/2018 | Guo | H01M 2/1613 |
| 10,171,681 B2* | 1/2019 | Raleigh | H04M 15/70 |
| 10,176,473 B1* | 1/2019 | Zettner | H04W 4/02 |
| 10,181,152 B1* | 1/2019 | Rao | G06Q 10/08 |
| 10,204,335 B1* | 2/2019 | Donavalli | G06Q 20/3224 |
| 10,207,327 B2* | 2/2019 | Hopkins | C22C 38/56 |
| 10,212,543 B2* | 2/2019 | Enriquez | G06Q 20/085 |
| 10,228,695 B2* | 3/2019 | Rezvani | G05D 1/0022 |
| 10,229,448 B2* | 3/2019 | Ahuja | G06Q 30/0631 |
| 10,242,540 B2* | 3/2019 | Chen | G06Q 20/405 |
| 10,262,289 B2* | 4/2019 | Vaananen | G06Q 10/083 |
| 10,275,786 B2* | 4/2019 | Bidgoli | G06Q 30/0207 |
| 10,291,451 B2* | 5/2019 | Wang | H04L 27/2602 |
| 10,318,809 B2* | 6/2019 | Schultz | G06T 11/60 |
| 10,360,560 B2* | 7/2019 | Bryant | G06Q 20/3278 |
| 10,373,160 B2* | 8/2019 | Ranganathan | G06Q 20/3224 |
| 10,373,246 B1* | 8/2019 | Groenjes | G06Q 40/00 |
| 10,387,876 B1* | 8/2019 | Buentello | G06Q 20/40 |
| 10,430,566 B2* | 10/2019 | Studnicka | G06F 21/31 |
| 10,445,750 B2* | 10/2019 | Chen | G06Q 20/20 |
| 10,467,706 B2* | 11/2019 | Lacoss-Arnold | |
| | | | G06Q 20/3224 |
| 10,475,029 B2* | 11/2019 | Acuna-Rohter | G06Q 20/4016 |
| 10,475,035 B2* | 11/2019 | Xu | G06Q 20/3224 |
| 10,482,398 B2* | 11/2019 | Hammad | G06Q 10/00 |
| 10,482,441 B1* | 11/2019 | Watson | G06Q 20/401 |
| 10,546,468 B2* | 1/2020 | Irudayam | G06Q 20/1085 |
| 10,560,799 B1* | 2/2020 | Vltavsky | G06Q 20/405 |
| 10,567,975 B2* | 2/2020 | Hoffberg | H04W 16/28 |
| 10,573,134 B1* | 2/2020 | Zalewski | G06Q 20/12 |
| 10,628,661 B2* | 4/2020 | Ionita | G06K 9/6202 |
| 10,685,386 B2* | 6/2020 | Waldron | H04L 63/0861 |
| 10,692,088 B1* | 6/2020 | Spindel | G06Q 20/3224 |
| 10,706,419 B2* | 7/2020 | Ferguson | G06Q 20/4016 |
| 10,713,644 B2* | 7/2020 | Dragushan | G06Q 20/202 |
| 2016/0225048 A1* | 8/2016 | Zoldi | G06Q 20/40145 |
| 2017/0228690 A1* | 8/2017 | Kohli | G06Q 10/0832 |
| 2018/0204204 A1* | 7/2018 | Giraudo | G06Q 20/4012 |
| 2019/0251571 A1* | 8/2019 | O'Reilly | G06Q 20/40145 |

\* cited by examiner

TRANSACTION VALIDATION AND FRAUD MITIGATION

ORIGIN

The innovation disclosed herein relates generally to the use of drones and more particularly, the use of drones and other biometric validation means in the financial and retail industries to enhance fraud detection, mitigation and transaction authentication.

BACKGROUND

An unmanned aerial vehicle (UAV), commonly known as a drone is an aircraft that does not have an onboard human pilot. The flight of UAVs may operate by real- or near-real time remote control or autonomously via onboard computers or preprogrammed flight plans.

UAVs are often preferred for and employed in missions too dangerous for humans as well as those that require a tedious amount of effort (e.g., reconnaissance). While conventionally drones were most often operated in military operations, the use of drones has expanded significantly into the civil and commercial realms. More specifically, drones have become prevalent in the recreational, commercial, scientific, agricultural sectors, among others.

Examples of drone use aside of the military sectors include, general recreation, surveillance, photography and the like. Recent efforts have been focused around product deliveries via drones. Drones have the capability of transforming the online e-commerce industry by becoming one of the most efficient modes of delivery in terms of time and cost. In fact, today, ownership and use of civilian and commercial drones vastly outnumbers that of military drones.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, systems and methodologies are disclosed that enable advanced authentication of a consumer or fraud detection based at least in part upon customer location and transaction geo-location verification. In some aspects, these verifications are employed or otherwise assisted via the use of a drone(s).

In aspects, a transaction location can be compared with an account holder location and, in the event that there is a threshold discrepancy, a drone can be deployed to the transaction location so as to perform additional validation prior to processing the transaction. As well, as appropriate and in the instance of a fraudulent transaction, the drone can be employed to policing and fraud detection in an attempt to identify and preemptively stop fraudsters from consummating a transaction.

Other aspects can employ geo-locations, triangulations and other known mechanisms to acquire a location of the account owner, customer and/or transaction location in order to facilitate verifications and authentications in processing the transaction. Once the location is identified, a drone or unmanned aircraft can be deployed to the location in order to gather critical information associated to potentially fraudulent transaction.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
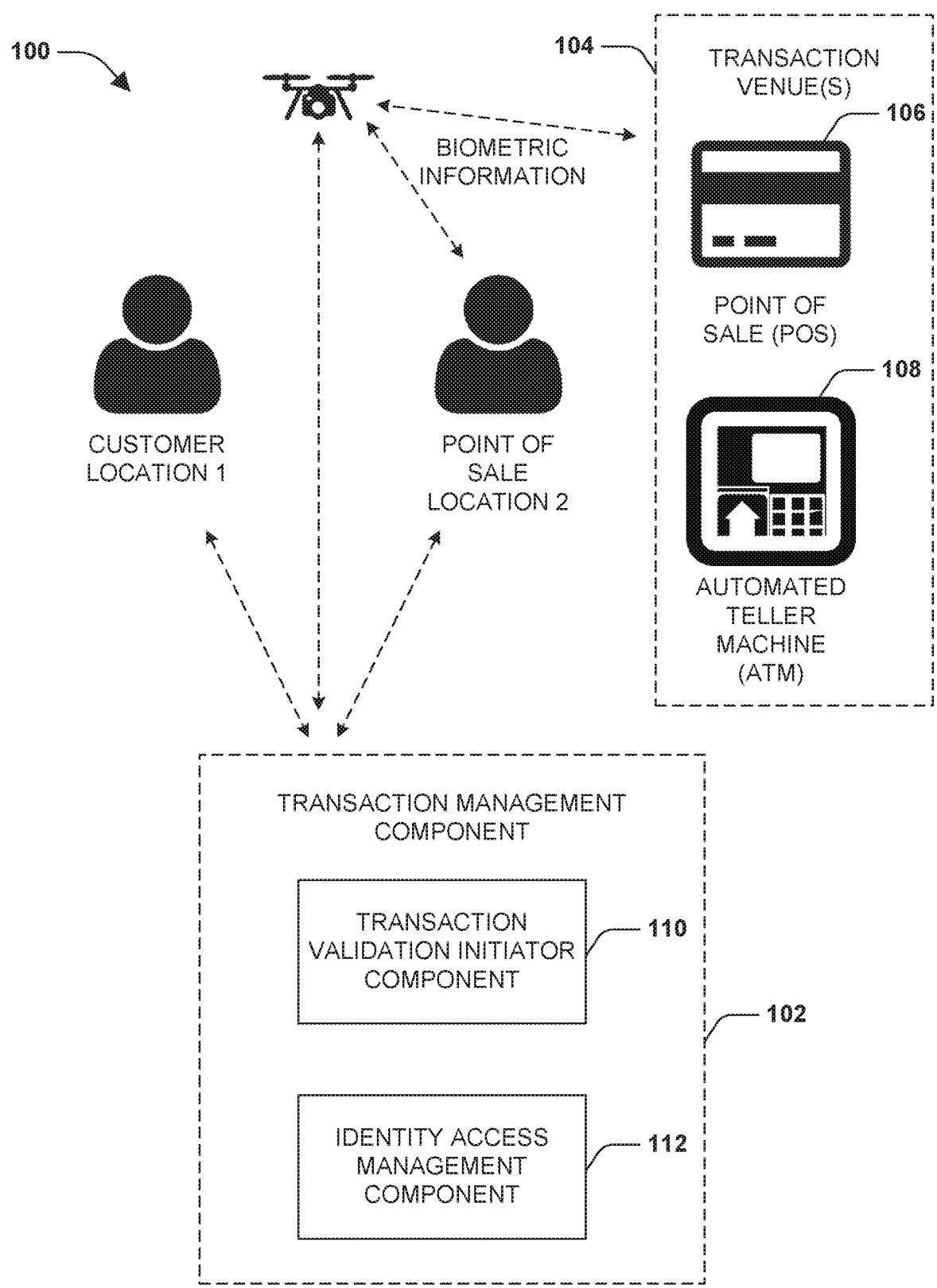
FIG. 1 illustrates an example embodiment of a transaction validation and fraud detection system in accordance with the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., communication devices, network protocols, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, in aspects, both an application running on a server and the server can be a component. One or more components can reside within a process and/or thread of execution, and a component can be localized on one computer and/or distributed between two or more computers.

As used herein, the term "infer" or "inference" generally refer to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

One classic issue that exists today is that it is very difficult, if not impossible to predict/prevent fraudulent transactions before they occur. As well, there is not an effective means to authenticate a suspicious/fraudulent transaction at an actual payment location or point of sale (POS). In other words, it is increasingly difficult to detect fraudulent transactions when a purchaser uses a credit card, debit card, charge card, smartphone e-pay application or the like. Oftentimes, transactions are authorized by the cardholder but, consummated by a trusted family member, friend or other entity on behalf of a cardholder. These situations are especially difficult to identify using conventional tactics.

The innovation discloses systems and methodologies that can perform physical customer (e.g., cardholder, account owner, etc.) location and transaction (point of sale (POS), etc.) geographical (i.e., geo) location validation via advanced authentication mechanisms. As described herein, in some aspects, the innovation employs unmanned drones to assist with the verification, validation or authentication. Additionally, in the instance of uncertainty or on-going fraudulent transactions, the drone(s) can be employed to assist perpetrator identification, detection and location.

By way of example and not limitation, in response to a determined suspicious transaction activity event, the system can identify and dispatch the most accessible drone to the transaction (e.g., POS) area. In some aspects, a drone can be dispatched to the customer's physical location. Here, the customer's physical location can be established using most any means including but, not limited to, geo-location of an IOT (internet of things) device/sensor, smartphone, smartwatch, last known location, or the like.

Once the drone arrives at the POS, it can perform additional validation at the current payment/transaction location before processing the transaction. Examples of facial recognition and other biometric examples will be discussed in more detail below with reference to the figures that follow. It will be appreciated that these processes can deter, mitigate, alleviate and most possibly prevent fraudulent activity from occurring at the outset. By leveraging cutting edge technologies, the innovation, in aspects, proposes adding additional levels of security to deter fraudulent activities as well as to detect and address fraudulent activities that occur despite diligent efforts. Further, it is to be understood that can employ advanced photonics video capture systems, e.g., on a flying drone, that would simultaneously analyze biometrics, including but not limited to, facial recognition, body language/behavioral analysis, heart rate detection etc. It is to be appreciated that biometrics and biometric analysis is not limited to physical biometric but also cognitive intelligence identification.

With reference now to the figures FIG. 1 illustrates an example embodiment of a transaction validation and fraud detection system 100 in accordance with the innovation. As shown, system 100 can include a transaction management component 102 that monitors transactions made by, or on behalf of a customer. It is to be understood that the transactions described herein refer to most any financial transaction made by, or on behalf of a customer. The customer refers a cardholder, financial account holder, or other entity financially responsible for the transaction. In one example, the customer can refer to a credit-, bank-, charge- or debit-card holder. In another aspect, the customer can refer to the designated owner of mobile or other computing device that is associated to and capable of consummating a transaction on behalf of the customer. It is to be appreciated that an account can be most any account by which the customer is financially responsible, including but not limited to bank/ financial institution accounts, credit accounts, third party service (e.g., mobile device) accounts or the like.

In the example of FIG. 1, the transaction management component 102 can monitor transaction venues 104. In examples, the transaction management component 102 can monitor credit/debit requests upon an account, smartphone app e-pay requests, IOT requests or the like. Upon identifying a request or transaction, the system 100 can trigger or initiate validation. As shown, it is to be appreciated that the innovation can be employed in most any transaction venue, including but not limited to, point of sale (POSs) 106, automated teller machines (ATMs) 108, as well as e-pay and internet apps (not shown) or the like. For instance, while the specification describes classic big box POS and ATM (and kiosk) transactions, the spirit and scope of the innovation is intended to include face-to-face personal transactions as well as other identifiable transactions.

The following example is provided to add context to the innovation and specifically not to limit the scope in any manner. With continued reference to FIG. 1, the customer at a first location is indicative of an account owner or cardholder. The POS is shown at a second location. Depending on the facts and circumstances of a particular transaction, it is possible that both locations are the same, i.e., in the instance of a non-fraudulent or otherwise authorized transaction.

Continuing with the example, consider that a suspect is at big box retail store (location 2) trying to make fraudulent payment using the customer's debit card. In accordance with the innovation, a Fraud Transaction Validation Initiator component 110 will perform an expeditious verification against the customer location (location 1) (e.g., using geofencing systems/physical web, triangulation, GPS (global positioning systems, etc.)) in comparison to the big box location (location 2). These two locations will be compared and, if a discrepancy is detected, a drone can be dispatched to a proximate location of the transaction (location 2).

Accordingly, the drone, e.g., via an image/video capture device, can gather suspect information (e.g., facial features for recognition, gait for identity analysis, etc.). Additionally, notifications can be sent to designated entities or parties (e.g., cardholder/customer, big box retailer, authorities, etc.) in an effort to thwart or mitigate any financial loss.

It is to be understood that the drone can be currently commercialized at a shopping mall or plaza whereby it can have access to most or all the stores and common areas in the mall. As will be described in this specification, the innovation provides an engineered solution for the broader area and industrialization of the practice for fraud verification using drones (Drone Space) and other image capture devices.

While many of the embodiments and examples described herein employ drones equipped with image and video capture mechanisms, it is to be understood that other aspects can employ static (e.g., in place) image capture (and video capture) mechanisms alone or in combination with the capabilities of a drone(s) so as to establish identity and/or assist in fraud investigation and mitigation. For example, an in-store camera, or network of in-store cameras can be employed alone or in combination with a drone(s) so as to gather information used to investigate a particular fraudulent scenario (e.g., transaction). These and other aspects are to be included within the scope of this disclosure and claims appended hereto.

As illustrated, an identity management component 112 can be provided to perform analysis of information gathered via the transaction validation initiator component 110. As will be described, the identity access management component 112 can process the location and identity information so as to enable fraud detection and/or mitigation. It will be understood and appreciated (and illustrated in FIG. 2), that a store or database can maintain information regarding entity identification information so as to assist in the processing of the gathered data. As well, as described herein, components illustrated in the figures can be co-located or distributed in disparate locations in alternative embodiments without departing from the spirit and/or scope of the innovation and claims appended hereto.

Figure 2:
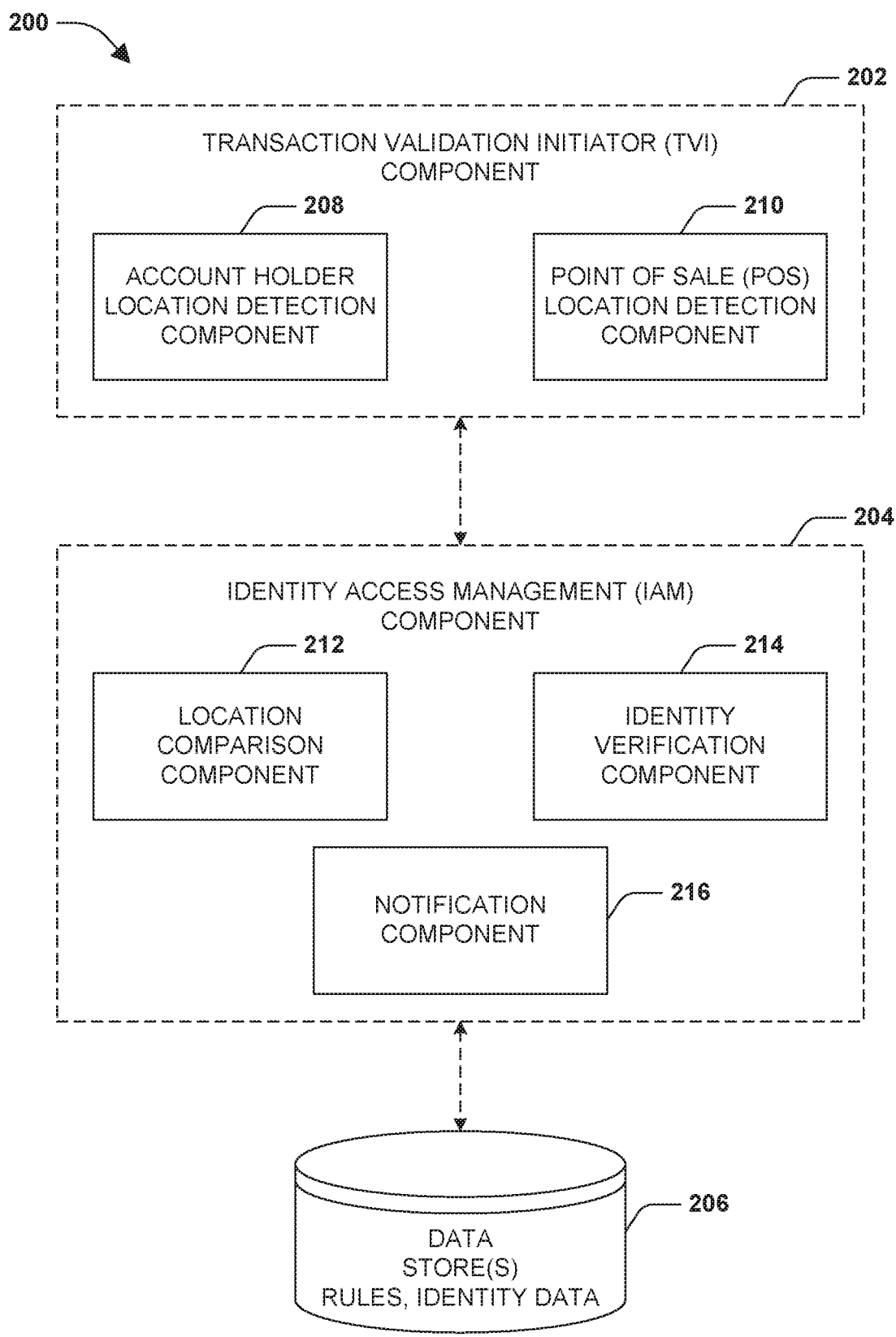
FIG. 2 illustrates an example embodiment of a transaction validation system in accordance with the innovation.

Turning now to FIG. 2, a transaction validation and fraud detection system 200 in accordance with the innovation is shown. As shown, the system 200 can include a transaction validation initiator (TVI) component 202, an identity access management (IAM) component 204 and a data store 206. Each of these components can have the same or similar functionality as those described with reference to FIG. 1 having like-named components. The data store(s) 206 can store identity data (e.g., biometric, facial recognition feature, etc.) which can be employed to by the TVI and IAM components respectively. Additionally, the store 206 can maintain threshold data that can be used to determine or infer a probability that a fraudulent transaction is taking place. Still further, the store 206 can employ historical location data, for example, in the instance that a customer is not easily located via known means, e.g., GPS, triangulation, etc. Here, for example, if the system logs a last known location of a customer in the state of Ohio at 2 pm and the suspect transaction occurs at 2:30 pm in the state of Florida, it can be determined that the customer is not the purchaser in the state of Florida due to the impossibility of travel time in accordance with the transaction.

As illustrated, the TVI component 202 can employ a customer location detection component 208 and a point of sale (POS) location detection component 210 to accordingly establish locations that can be analyzed by the IAM component 204. In operation, the customer location detection component 208 can employ known techniques to establish a customer's current (or recent) location. Here, GPS, triangulation, etc. methodologies and systems can be employed to establish a location relevant or associated with the customer. Additionally, the system is capable logging or retrieving a last known location of a customer, e.g., as stored in data store 206. For instance, if a customer powers down a mobile device (or IOT device) and is no longer detectable, the last known location and date/time stamp information can be employed by the system for processing.

The POS location detection component 210 can identify a location by most any known means including but, not limited to, GPS, triangulation, network or machine address(es), or the like. Similarly, a log of POS locations can be kept (e.g., stored in data store 206) for efficient retrieval. Most any mechanism or system can be employed to establish locations both of the customer and POS location with regard to the components (208, 210) described herein. This location information can be communicated to the IAM component 204 for processing whereby a location comparison component 212 and an identity verification component 214 can evaluate.

The location comparison component 212 can employ basic calculation methodologies or more complex inference methodologies to arrive with the location and relative distance between a customer and the POS. If a disparity is found and determined that warrants the identity verification component 214 to further investigate, a notification component 216 can be employed to alert relevant and otherwise interested parties (e.g., customer, authorities, POS vendor, IOT (Internet of Things) devices (e.g., television, refrigerator, automobile, lights, home alarm, etc.) etc.). In accordance with aspects, the alert can be communicated using most any modality including but, not limited to text (e.g., SMS, MMS) message, email, telephone, or the like.

As well, in response to the trigger to investigate, the identity verification component 214 can put into motion or dispatch a drone(s), interrogate in-place cameras or the like. Information captured using these means can be employed to further investigate and/or mitigate fraudulent transactions. These and other examples will be described in greater detail below.

Figure 3:
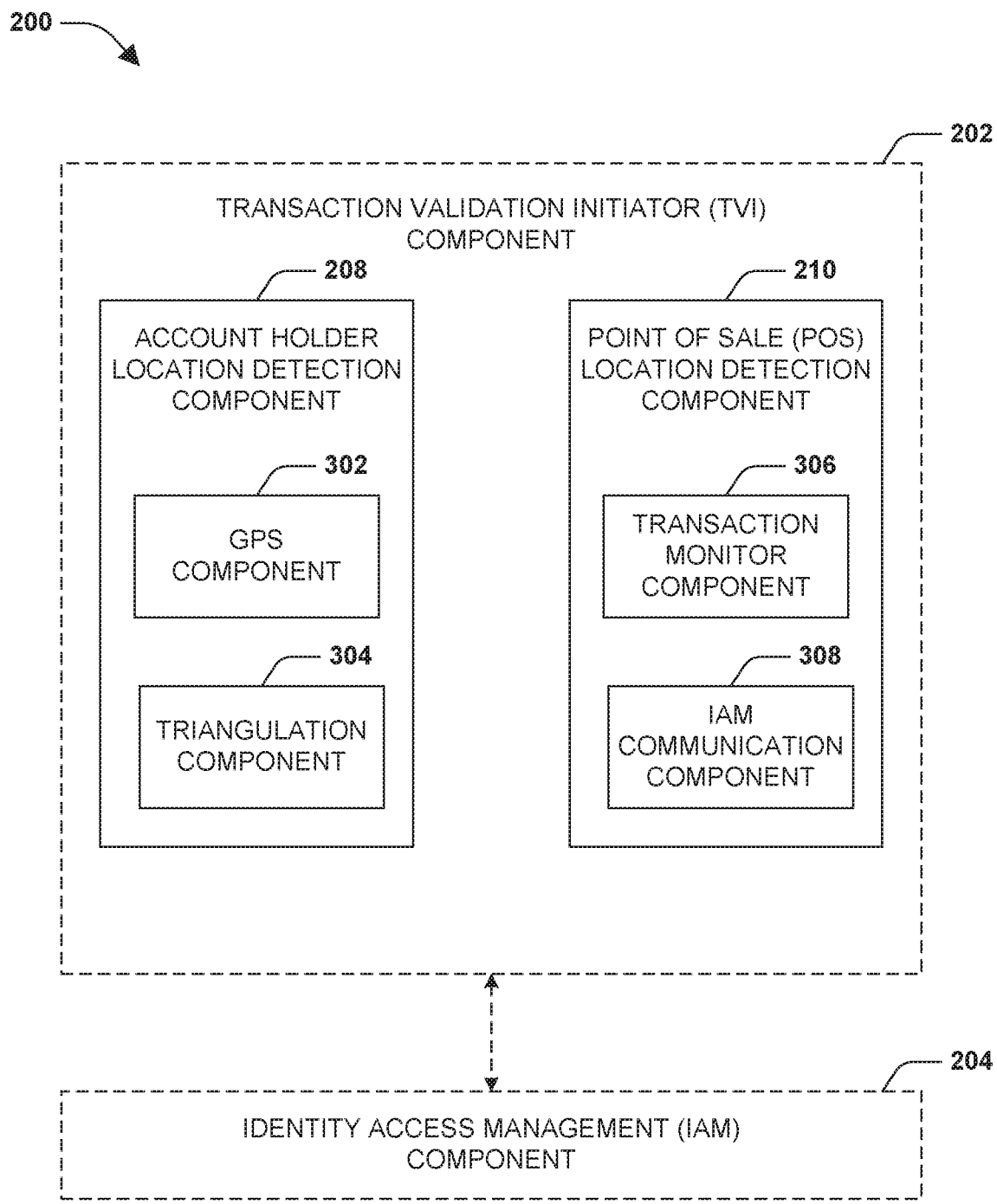
FIG. 3 illustrates an example embodiment of a transaction validation initiator component in accordance with aspects of the innovation.

FIG. 3 illustrates a more detailed view of an example of a TVI component 202 in accordance with aspect of the innovation. Here, as described above, once a transaction is detected (e.g., via a monitor component), the customer location detection component 208 can employ most any mechanisms known in the art to establish a location of a customer (e.g., cardholder). Assuming the customer has an active mobile device, a GPS component 302 or triangulation component 304 can be employed to generate identification of the location. Further, as described herein, a last known location, or other IOT (e.g., vehicle) devices, can be employed to establish the location of a customer at the time of a transaction. It is to be understood and appreciated that the TVI component 202 can be capable of real- or near real-time monitoring (e.g., via a monitoring component) of transactions initiated using a customer's assets (e.g., credit/debit card, mobile wallet, mobile app, etc.).

The POS location detection component 210 can include a transaction monitor component 306 and an IAM communication component 308. In operation, the transaction monitor component 306 can observe and monitor activity related to a customer's assets, cards, applications (e.g., mobile wallet), etc. Once a transaction is discovered, an IAM communication component 308 can communicate the locations (customer and POS) to the IAM component 204 along with transaction information.

Figure 4:
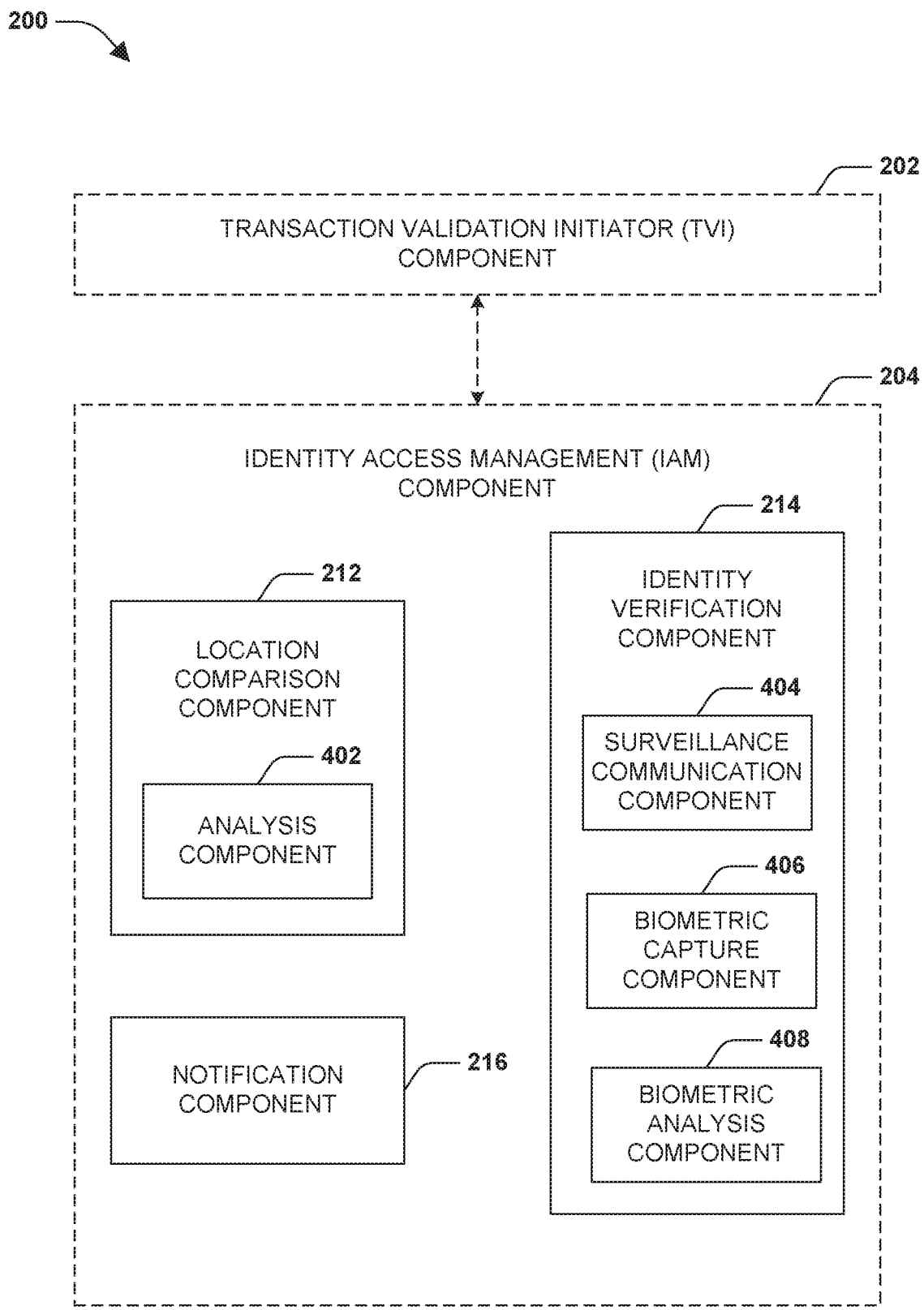
FIG. 4 illustrates an example embodiment of an identity access management component in accordance with the innovation.

Referring now to FIG. 4, a more detailed illustration of the example system 200 is shown. In particular, a more detailed view of the IAM component 204 and subcomponents is illustrated. More particularly, the example IAM component 204 can include a location comparison component 212 having an analysis component 402 or logic therein. The analysis component 402 is capable of comparing the relative determined locations (or approximate locations) of each the customer and POS so as to establish if a fraud verification should be triggered. As described, this location disparity result can be compared against a predetermined rule or threshold so as to conclude if a fraud investigation should commence. In aspects, the threshold can be based upon most any factor, including but not limited to, customer preference, customer history, POS location (e.g., risky location), transaction amount or the like. Should a determination be made that a fraud investigation should commence, the identity verification component 214 is triggered to begin the investigation.

Here, the identity verification component 214 can include a surveillance communication component 404 that enables, for example, dispatch and communication with a selected or appropriate drone device. While this example employs a drone device for surveillance, as described herein, other examples can employ in-place or otherwise static surveillance mechanisms by which information can be gathered (e.g., static video surveillance network).

In gathering data, a biometric capture component 406 and a biometric analysis component 408 can be employed to attempt to identify the purchaser at the POS. Here, the identity of the purchaser can be established and compared against data stored that corresponds to the customer, approved users or fraudsters. The system is able to employ the notification component 216 to alert the customer or other relevant entities (e.g., authorities, retailer), of pertinent information related to the transaction.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Figure 5:
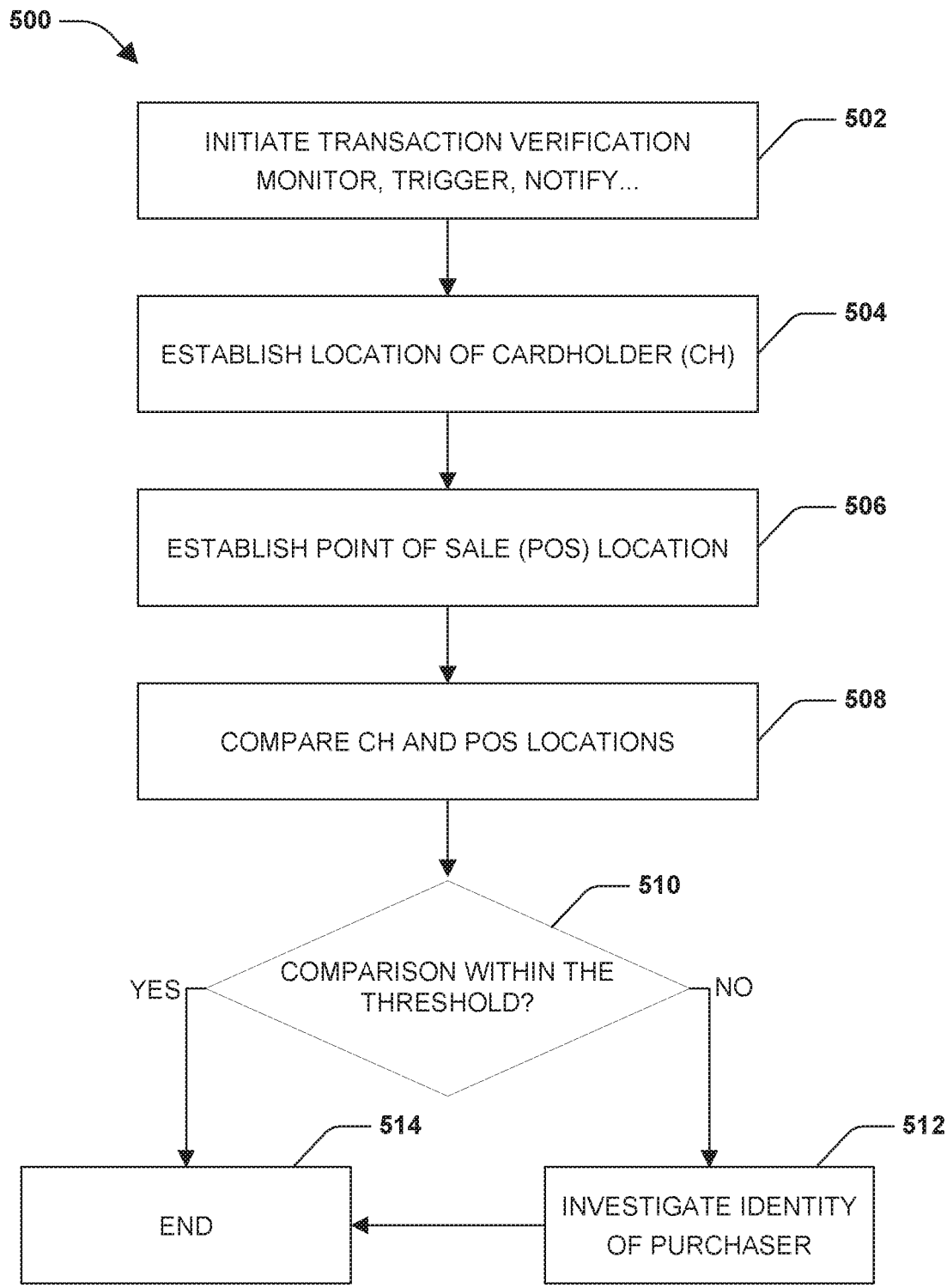
FIG. 5 illustrates an example methodology of transaction validation in accordance with the innovation.

FIG. 5 illustrates an example methodology 500 of validation in accordance with aspects of the innovation. Beginning at 502, transaction (e.g., consumer, purchaser) verification is initiated. For instance, the methodology can monitor activity related to a customer's cards, accounts, devices, etc. and upon detection, can trigger verification and notify as appropriate. These acts or series of acts can be incorporated into the act of initiating transaction verification.

Locations of both the cardholder (CH) (i.e., customer) and the POS are established at 504 and 506 respectively. As described herein, most any known means of detection can be employed without departing from the spirit and/or scope of the innovation described herein. In examples, GPS, triangulation, IP (internet protocol), last known location or the like can be employed. Similarly, the location of a POS can be hard coded into the system as appropriate to be used as a reference point in the comparison that takes place at 508.

At 508, a distance can be calculated between the location of a CH and the POS. Once established, this distance can be compared to a threshold at 510 to determine if the distance is within an acceptable margin or threshold. In aspects, the threshold can be pre-determined or otherwise based upon factors including but, not limited to, identity of CH or purchaser, location of POS, amount of transaction, type of transaction, time of day, etc. as well as other contextual factors.

Figure 6:
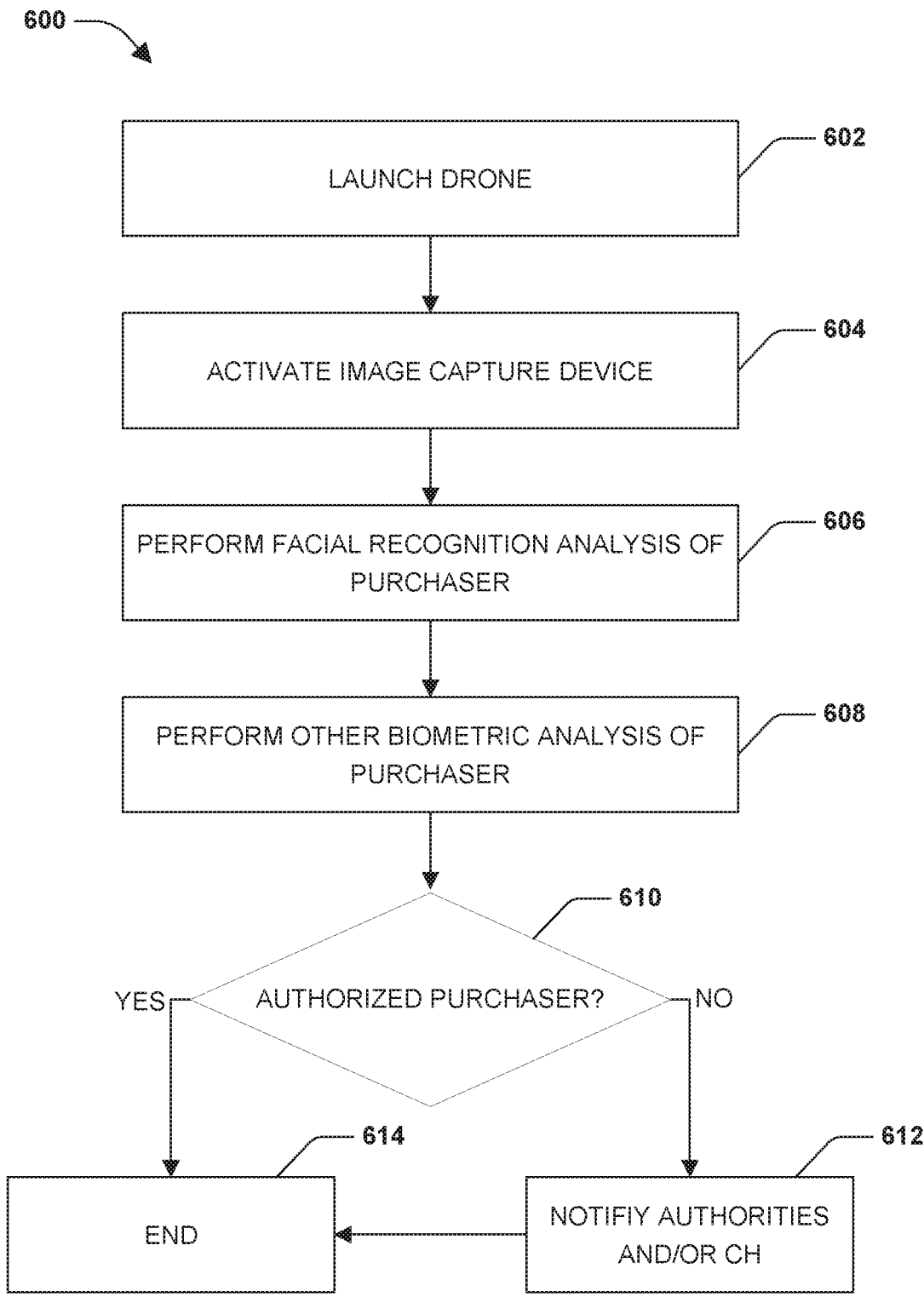
FIG. 6 illustrates an example methodology of fraud investigation in accordance with the innovation.

Turning now to FIG. 6, an example methodology of investigating and/or verifying identity in accordance with aspects of the innovation is shown. At 602, once verification is triggered (e.g., from FIG. 5), a drone can be launched or dispatched to the location of the POS. Similarly, in other aspects, a relevant network of video/image capture devices can be identified that cover the proximate location of the transaction. For instance, in-store video surveillance can be employed in place of the drone at 602, in other aspects.

The image capture devices can be activated at 604. Here, the cameras or other image/video capture devices can be triggered to capture/record/stream data that can be processed in an effort to identify the purchaser. At 606, 608, the data can be processed to perform facial recognition analysis and other biometric analysis (e.g., gait analysis, etc.) respectively.

A determination is made at 610 to establish if the purchaser is an authorized purchaser. If the purchase is deemed to be an authorized entity, the methodology ends. If not an authorized entity, a notification or alert can be sent to the CH, authorities, seller, retail establishment or other desired entity or group of entities. In examples, it is possible that the system determines a threshold triggered disparity between the location of the cardholder and the POS. Once the drone is dispatched or other image capture device deployed, the analysis may deem that the actual purchaser is an authorized entity (e.g., family member, caretaker, etc.). The system can enable users (or cardholders) to authorize (e.g., pre-authorize) entities whereby the authorized entities' information can be maintained in the store(s) as is the cardholder's information. This information can be interrogated for analysis by the system as described.

The following discussion is included to provide more context to the innovation and is specifically not intended to limit the innovation in any manner. It is to be understood and appreciated that other variations of the features, functions and benefits of the innovation exist which are intended to be included within the spirit and/or scope of the innovation and claims appended hereto.

In aspects and in operation, a user can either use a financial institution provided payment app, mobile wallet or physical card (e.g., debit/credit) to commence a transaction at a POS. Here, the user triggers payment, e.g., using a button via NFC (near field communication) or swipes the card.

With regard to a process of validating a possible fraudulent transaction, as described, the fraud validation initiator can trigger the validation process immediately when the transaction starts at the POS, kiosk or other location. Using a nearest drone or beacons or telecom provider the system can validate the cardholder (e.g., account owner) location. Additionally, the cardholder location can be compared and/or validated (e.g., via mobile/TOT) against the current POS location. (e.g., big box POS).

A nearest drone can be sent to the POS location to initiate or complete facial recognition and body language analysis. It is to be understood that other mechanisms (e.g., static cameras) can be employed in other aspects. Still further, it is to be understood that, in this aspect, the drone is dispatched regardless of the location analysis however, in other aspects, the drone is dispatched in situations where the delta of locations exceeds a threshold. If all the acts prove valid, the transaction can proceed without any additional steps of authentication.

In another scenario whereby the geo-locations of the cardholder and POS do not match, the system can rely upon the POS analysis to establish if the entity commencing the transaction is indeed an authorized entity. In one example, it is possible that the cardholder does not have a trackable device (e.g., smartphone) so as to establish a first location. Similarly, aspects exist whereby a trusted or authorized entity (e.g., family member) carries out a transaction on behalf of or in accordance with the permission of a cardholder. In these examples, the drone (or static camera system) can initiate analysis of body language and facial recognition. It will be understood and appreciated that advanced radiology capabilities (e.g., evaluation by drone from a distance) can be employed by the innovation.

Additional biometric validation (e.g., via drone) can be commenced if the above fails, or example, in a possible scenario of a first time usage by a family member contingent to the fact that family members identity records are available. Here, the system can establish if the entity (family member) is an authorized entity. As described herein, in situations where the fraud validator outcome fails, the system can instantly block the transaction, alert the merchant, cardholder, authorities, etc. to mitigate and assist in the investigation and capture of the fraudster.

In aspects whereby the purchaser employs a physical card (e.g., credit or debit), a fraud transaction initiator module can fetch the geolocation of the cardholder (or account owner) via a mobile/TOT smartwatch or other IOT device (e.g., television, refrigerator, automobile, lights, home alarm, etc.). In aspects, the geolocation of the cardholder can be accessed via locating their mobile/smartwatch. In other aspects, the system can initiate a telephone call to the account owner to obtain confirmation or triangulate location with mobile signals from the telecom provider.

The system can validate and compare the location of the account owner (cardholder) with the location of the actual transaction (POS). In aspects, the POS or kiosk can send the geolocation of the merchant or, if not feasible, a drone can poll the customer's card geo-location, e.g., kiosk/IOT card for a match.

In a scenario, both of the geo-location match or are within a defined acceptable threshold. Here, the system can authorize and permit proceeding with the transaction/payment. In some aspects, prior to authorizing the transaction, the system can analyze facial recognition and body language, e.g., via a drone with advanced radiology capabilities. Other aspects can require conventional authorization e.g., PIN (personal identification number)/authorize, an automated voice validation call, etc.

In another scenario, both of the geo-locations do not match or exceed a desired threshold distance. Here, the system can analyze facial recognition and body language, e.g., via drone or other static image capture device(s). If the analysis proves valid and the customer is verified, the transaction is authorized to proceed. It will be understood that this scenario can occur, for example if the cardholder misplaced, powered down or is without their mobile device.

In addition to facial recognition and gait/body language analysis, other examples of biometric validation include but are not limited to iris, facial expressions, finger/palm prints or the like.

Similarly, in this scenario, the system can validate an authorized family member or other trusted entity (e.g., care giver, friend). Additional biometric screening can be employed in aspects as/if desired or other suspicion occurs.

If not validated, the transaction can be blocked and an alert can be transmitted as described above. The alert can be sent to most any entity or device including but, not limited to, the cardholder (account owner), authorities (police/security), retailer, connected IOT devices (e.g., television, refrigerator, automobile, lights, home alarm, etc.), etc. As appropriate or desired, the system contemplates intentional delay time for the transaction to be approved. Here, an intentional delay can provide enough time for the authorities to investigate and possibly capture the fraudster.

Following is a discussion of validation acts in the scenario of mobile device/wearable transactions. Here, the fraud transaction initiator module can fetch the geo-location of the cardholder (account owner) mobile/IOT smartwatch. For example, the system can identify the geo-location of the cardholder's mobile/watch. Alternatively, the system can initiate a call to the cardholder's device to obtain confirmation or to triangulate location with mobile signals from the telecom provider.

As described, the cardholder location (location 1) can be compared to the location of the actual transaction (POS). In some examples, by default an NFC payment kiosk can transmit the geo-location of the merchant or POS. If both of the geo-locations match or are otherwise within an approved threshold, the system can approve the transaction. However, due to the fact that there is a possibility of an imposter using a cardholder's device to transact, the system can analyze facial recognition, body behavior and other biometrics at the NFC payment kiosk. In yet other aspects, in addition to drone or static camera interrogation, facial recognition or other biometric validation can occur via a mobile device (or other network/Internet capable device) so as to authorize a transaction. Here, because the locations are deemed to be the same (cardholder device vs POS), mobile device identity verification can suffice. However, if authorization is not validated, the system can block the transaction, send notifications, etc. as described herein.

As described within this specification, the innovation is capable of identifying and, mitigating and potentially blocking a fraudulent transaction from occurring. In doing so, the innovation can block the suspicious transaction prior to occurrence of fraudulent activity, thereby mitigating financial losses. Geo-Locations can be employed and combined with physical verification (e.g., drone or static camera verification) in response to potential fraudulent transactions to avoid credit/debit card crimes. In-store NFC payments/card payments can employ additional facial recognition and body language analysis (e.g., behavior) to establish authorization related to transactions.

As disclosed, the innovation can employ drones to perform verification on behalf of a financial entity, cardholder or merchant. It to be appreciate that, in some cases of NFC payments where drone or other biometric fails verification of the geo-location of the cardholder, it is to be understood that it would be prudent to emphasize on additional authentication measures to process the payment with biometric measures, e.g., via a drone, static image/video capture, voice recognition, secret question answer over phone, etc. In all, the innovation provides systems and methodologies by which allegedly fraudulent or suspect transactions can be further investigated in real- or near real-time so as to assist in loss mitigation and potentially identification of fraudsters.

Figure 7:
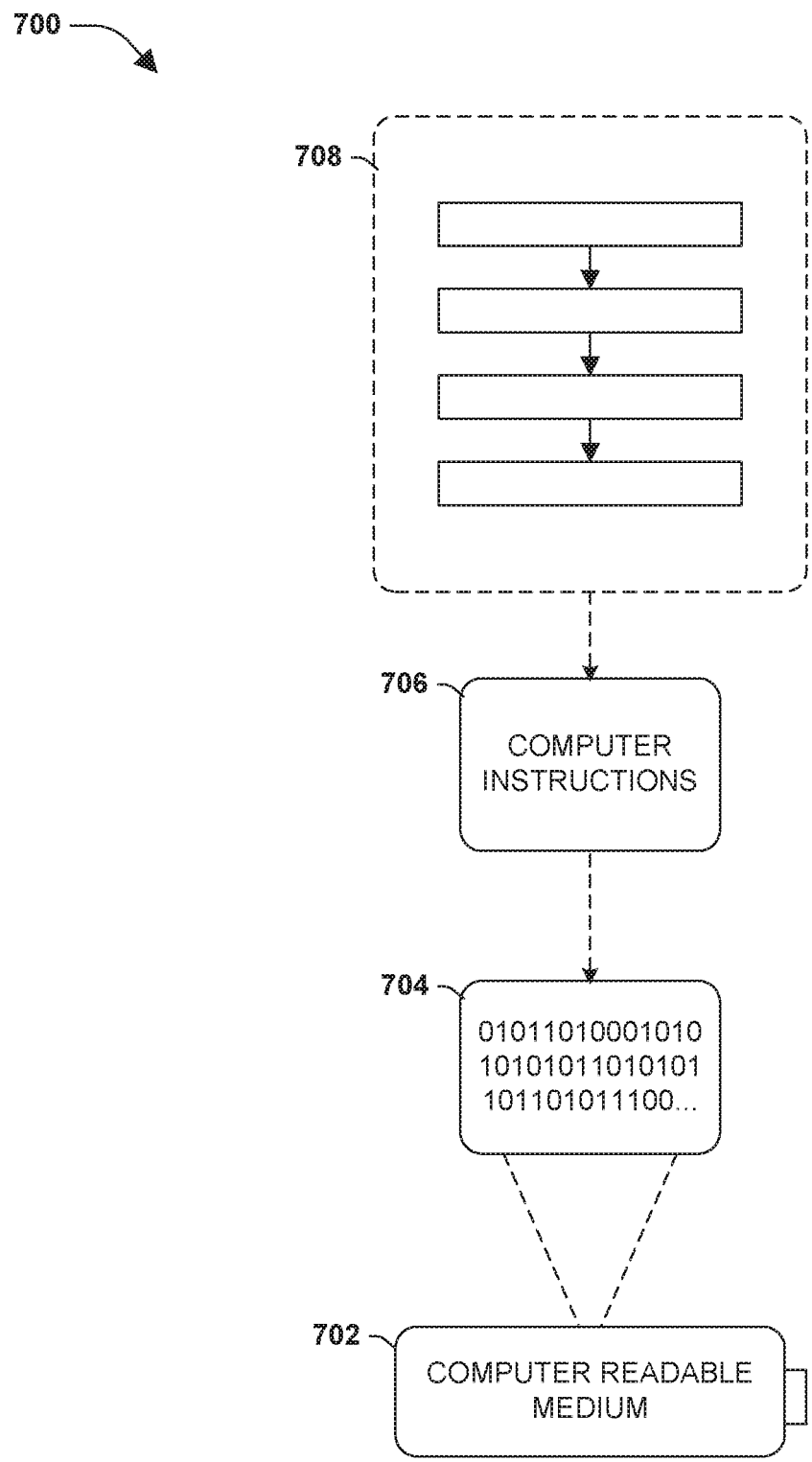
FIG. 7 illustrates an example computing environment that enables aspects of the innovation.

Still another embodiment involves a computer-readable medium including processor-executable instructions configured to implement one or more embodiments of the techniques presented herein. An embodiment of a computer-readable medium or a computer-readable device devised in these ways is illustrated in FIG. 7, wherein an implementation 700 includes a computer-readable medium 702, such as a CD-R, DVD-R, flash drive, a platter of a hard disk drive, etc., on which is encoded computer-readable data 704. This computer-readable data 804, such as binary data including a plurality of zero's and one's as shown in 704, in turn includes a set of computer instructions 706 configured to operate according to one or more of the principles set forth herein. In one such embodiment 700, the processor-executable computer instructions 706 may be configured to perform a method 708, such as the method 500 of FIG. 5 or the method 600 of FIG. 6. In another embodiment, the processor-executable instructions 706 may be configured to implement a system, such as the system 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
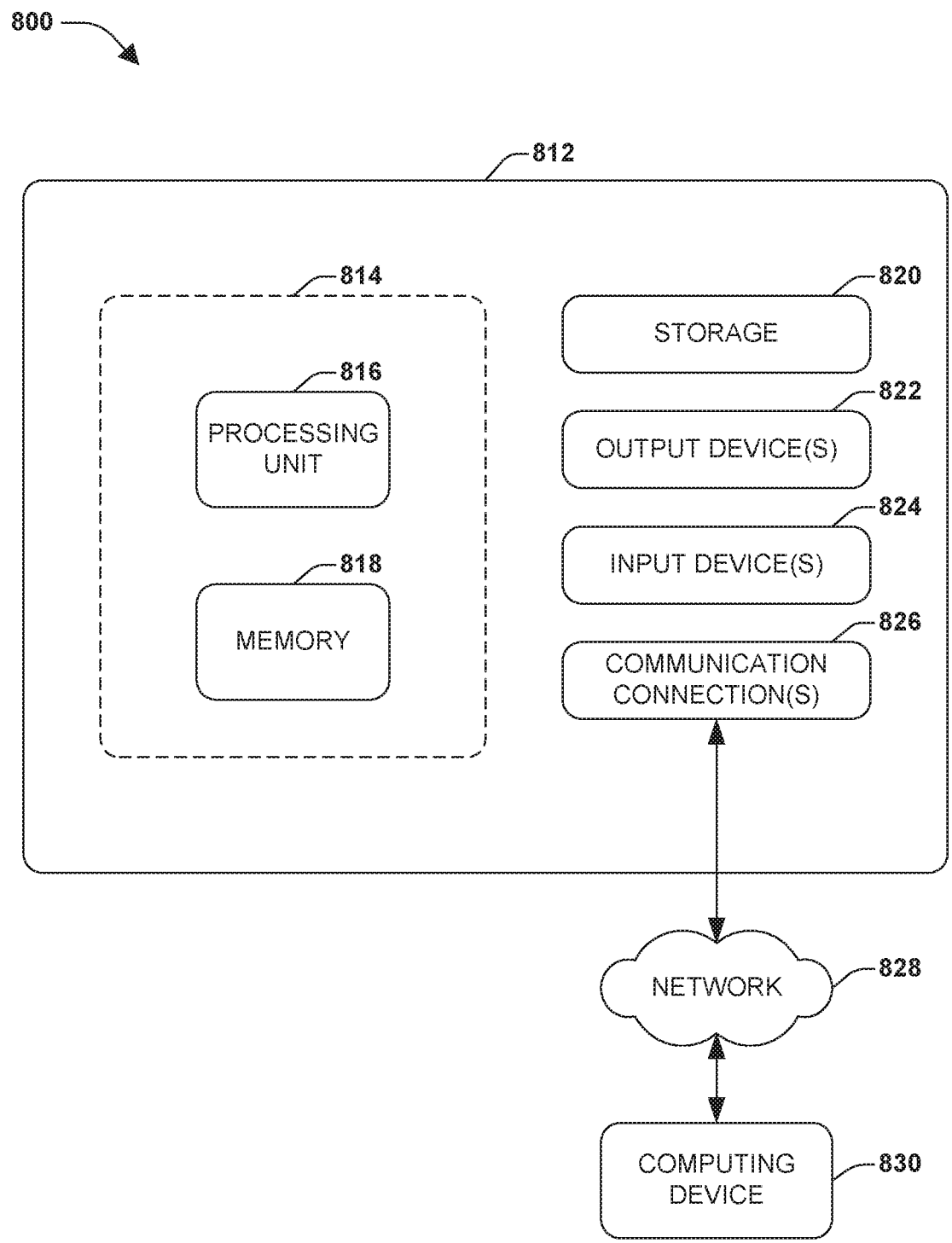
FIG. 8 illustrates an example network environment that enables aspects of the innovation.

FIG. 8 and the following discussion provide a description of a suitable computing environment to implement embodiments of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates a system 800 including a computing device 812 configured to implement one or more embodiments provided herein. In one configuration, computing device 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other embodiments, device 812 includes additional features or functionality. For example, device 812 may include additional storage such as removable storage or non-removable storage, including, but not limited to, magnetic storage, optical storage, etc. Such additional storage is illustrated in FIG. 8 by storage 820. In one or more embodiments, computer readable instructions to implement one or more embodiments provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by device 812. Any such computer storage media is part of device 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 812 includes input device(s) 824 such as keyboard, mouse, pen, voice input device, touch input device, infrared cameras, video input devices, or any other input device. Output device(s) 822 such as one or more displays, speakers, printers, or any other output device may be included with device 812. Input device(s) 824 and output device(s) 822 may be connected to device 812 via a wired connection, wireless connection, or any combination thereof. In one or more embodiments, an input device or an output device from another computing device may be used as input device(s) 824 or output device(s) 822 for computing device 812. Device 812 may include communication connection(s) 826 to facilitate communications with one or more other devices.

Although, in accordance with some aspects, the subject matter has been described herein in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

Although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A transaction management system, comprising:
    a transaction validation initiator component that identifies an account owner location and a transaction location, wherein a customer is present at the transaction location;
    an identity access management component that compares the account owner location to the transaction location and authenticates or denies a transaction based at least in part upon a distance reflected by a result of the comparison,
    a data store which stores identity information that may be employed by the transaction validation initiator component and identity access management component and maintains threshold data used to determine or infer a probability that a transaction is fraudulent, and;
    an identity verification component that biometrically identifies the customer and wherein the biometric identification includes at least facial recognition and body language analysis, and is employed to allow or deny the transaction;
    wherein the transaction validation initiator component, identity access management component, and data store may be distributed in disparate locations,
    wherein when the customer employs a physical card, the transaction validation initiator component fetches the location of the customer via a device.

2. The transaction management system of claim 1, wherein the biometric identification further includes at least facial recognition.

3. The transaction management system of claim 2, wherein the identity verification component includes a drone capable of capturing biometric data associated with the customer.

4. The transaction management system of claim 3, wherein the identity verification component includes a network of in-store cameras employed in combination with drones so as to gather information used to investigate a particular fraudulent scenario.

5. The transaction management system of claim 2, further comprising an account owner location detection component that determines the account owner location by at least one of global positioning system (GPS) or triangulation.

6. The transaction management system of claim 2, further comprising a notification component that alerts an authorized entity when the result of the comparison exceeds a threshold.

7. The transaction management system of claim 2, wherein the transaction validation initiator component actively monitors a payment mechanism of the account holder and triggers validation of the transaction based at least in part upon an indication of transaction activity.

8. The transaction management system of claim 7, wherein the payment mechanism is one of a mobile wallet, credit card, debit card, or an IOT (internet of things) device.

9. The transaction management system of claim 1, wherein the data store employs historical location information.

10. The transaction management system of claim 2, wherein the verification component, after establishing the identity of the customer, compares it to stored data that corresponds to the customer, approved user, or fraudsters.

11. The transaction management system of claim 3, wherein the drone has advanced radiology capabilities.

12. The transaction management system of claim 3, wherein the drone employs an advanced photonics video capture system and simultaneously analyzes multiple types of biometric data.

13. The transaction management system of claim 6, wherein notification alerts sent to authorized entities take the form of text messages, emails, or phone calls.

14. The transaction management system of claim 1, wherein the threshold is based on at least one of customer preference, customer history, point of sale location, and transaction amount.

15. The transaction management system of claim 1, wherein the transaction validation initiator component comprises a customer location detection component and a point of sale (POS) detection component which work together to establish locations to be analyzed by the identity access management component.

16. The transaction management system of claim 1, wherein the system is operative to log or retrieve the last known location of a customer as stored in the data store, wherein system retrieves the last known location using an IoT device.

17. The transaction management system of claim 15, wherein a log of POS locations is stored in the data store for efficient retrieval.

18. The transaction management system of claim 17, wherein the identity access management component comprises a location comparison component and an identity verification component operative to analyze POS location information communicated to the identity access management component.

19. The transaction management system of claim 6, wherein the authorized entity is one of a customer, a point of sale (POS) vendor, or an internet of things (IOT) device.

20. The transaction management system of claim 8, wherein the IOT device is a smartwatch.

\* \* \* \* \*